United States Patent [19]
Tanimura et al.

[11] Patent Number: 5,556,546
[45] Date of Patent: Sep. 17, 1996

[54] METHOD OF SEPARATION INTO THREE COMPONENTS USING A SIMULATED MOVING BED

[75] Inventors: Masatake Tanimura; Masao Tamura, both of Tokyo, Japan

[73] Assignee: Mitsubishi Kasei Engineering Company, Tokyo, Japan

[21] Appl. No.: 362,927

[22] Filed: Dec. 23, 1994

[30]  Foreign Application Priority Data

Dec. 27, 1993 [JP] Japan .................................. 5-333242

[51] Int. Cl.$^6$ ................................................ B01D 15/08
[52] U.S. Cl. ....................... 210/659; 210/198.2; 127/46.2
[58] Field of Search ..................................... 210/635, 656, 210/659, 198.2; 127/30, 46.1, 46.2, 46.3, 55

[56] References Cited

U.S. PATENT DOCUMENTS

| | | | |
|---|---|---|---|
| 4,267,054 | 5/1981 | Yoritomi | 210/659 |
| 4,332,623 | 6/1982 | Ando et al. | 127/46.2 |
| 4,379,751 | 4/1983 | Yoritomi et al. | 210/659 |
| 4,412,866 | 11/1983 | Schoenrock et al. | 127/46.2 |
| 4,478,721 | 10/1984 | Gerhold | 210/659 |
| 4,498,991 | 2/1985 | Oroskar | 210/659 |
| 4,970,002 | 11/1990 | Ando et al. | 210/659 |
| 4,990,259 | 2/1991 | Kearney | 127/46.2 |
| 5,064,539 | 11/1991 | Tanimura et al. | 210/659 |
| 5,102,553 | 4/1992 | Kearney | 210/659 |
| 5,122,275 | 6/1992 | Rasche | 210/659 |
| 5,156,736 | 10/1992 | Schoenrock | 210/659 |
| 5,198,120 | 3/1993 | Masuda | 210/659 |
| 5,223,143 | 6/1993 | Masuda | 210/659 |
| 5,391,299 | 2/1995 | Masuda | 210/659 |

FOREIGN PATENT DOCUMENTS

| | | | |
|---|---|---|---|
| 0010769 | 5/1980 | European Pat. Off. | 210/198.2 |
| 0140572 | 5/1985 | European Pat. Off. | 210/198.2 |
| 0279946 | 8/1988 | European Pat. Off. | 210/198.2 |
| 0345511 | 12/1989 | European Pat. Off. | 210/198.2 |
| 3209354 | 9/1991 | Japan | 210/198.2 |
| 4227804 | 8/1992 | Japan | 210/198.2 |
| 6170112 | 6/1994 | Japan | 210/198.2 |

*Primary Examiner*—Ernest G. Therkorn
*Attorney, Agent, or Firm*—Sughrue, Mion, Zinn, Macpeak & Seas

[57] ABSTRACT

The method of chromatographic separation comprises: a feed-withdrawal step in which, with liquid flow being permitted from the first to the third unit beds in the simulated moving bed, an eluant is fed into the first unit bed and the feed stock is fed into the third unit bed while, at the same time, part of the effluent from the first unit bed is withdrawn from the system as a fraction rich in component B and the effluent from the third unit bed is withdrawn from the system as a fraction rich in component C; a circulation stage in which, with liquid circulation being permitted through the simulated moving bed, the liquid in the simulated moving bed is moved downstream without liquid feed to or withdrawal from the simulated moving bed; and a withdrawal stage in which, with liquid flow being permitted from the second to the first unit beds, the eluant is fed to the second unit bed and the effluent from the first unit bed is withdrawn from the system as a fraction rich in component A; wherein, after the above three stages are performed, the same stages are repeated except that feed stock and eluant are fed to, and effluents are withdrawn from unit beds which exist immediately downstream of the respective corresponding unit beds.

9 Claims, 2 Drawing Sheets

5,556,546

METHOD OF SEPARATION INTO THREE COMPONENTS USING A SIMULATED MOVING BED

BACKGROUND OF THE INVENTION

1. Field of the Invention

The present invention relates to a chromatographic process using a simulated moving bed. More specifically, the invention relates to the chromatographic process of separating a feed stock containing three components that interact with an adsorbent by different degrees of intensity into fractions that are rich in the respective components using a simulated moving bed. The invention particularly relates to the chromatographic process by which the component in the feed stock that interacts moderately with the adsorbent can be recovered in high purity. According to the invention, sucrose can be recovered in high purity from molasses.

2. Description of the Related Art

Liquid chromatography is used extensively in separating operations on an industrial scale. In the simplest version of chromatographic processes, a single bed packed with an adsorbent is alternately supplied with a feed stock and an eluant and the effluent from the bed is fractionated according to its composition. This method provides for the separation of the feed stock into the respective components but, on the other hand, it requires large volume of eluant and the efficiency of bed is low because it is a batch-wise process.

In contrast, a simulated moving bed process permits continuous operation, requires smaller volume of eluant, provides for higher efficiency of bed; and, hence, it is a favored approach in large-scale chromatographic operations.

In chromatography using a simulated moving bed, a feed stock is, in principle, separated into two fractions, one being rich in a component that interacts strongly with an adsorbent packed in the bed and the other being rich in a component that interacts less strongly with the adsorbent. More specifically, two feed ports, one for the feed stock and the other for the eluant, and two withdrawal ports, one for the fraction rich in the strongly interacting component and the other for the fraction rich in the less strongly interacting component, are simultaneously active in the simulated moving bed and, at a given time interval, these feed-withdrawal ports are switched to the corresponding downstream feed-withdrawal ports. Therefore, with the simulated moving bed system of chromatography, a feed stock containing three components, the first that interacts strongly with the adsorbent, the second that interacts moderately and the third that interacts weakly, cannot be fractionated into separate fractions rich in the respective components. One of the three components will be recovered from the simulated moving bed as a mixture with either one of the remaining components. Consider, for example, sugar beet molasses which contains not only sucrose and ash and other non-sugars but also betaine. The order of the intensity of interaction with strongly acidic cation-exchange resins of alkali metal salt forms which are customarily used in chromatographic separation of sucrose from molasses is: betaine>sucrose>ash and other non-sugars. When sugar beet molasses is fractionated by a conventional chromatographic technique using a simulated moving bed, two fractions are obtained, one being rich in sucrose and the other rich in ash and other non-sugars. The betaine is distributed in both fractions. It is therefore impossible to recover sucrose and betaine separately from the sugar beet molasses by a conventional chromatographic process using a simulated moving bed. Furthermore, the betaine distributed in the sucrose-rich fraction lowers the purity of the sucrose in this fraction.

SUMMARY OF THE INVENTION

The present invention has been made to solve the above-mentioned problems accompanying the conventional chromatographic process, and an object of the invention is to provide a method of separating a feed stock containing a component A that interacts strongly with an adsorbent, a moderately interacting component B and a weakly interacting component C into at least three fractions, one being rich in component A, a second being rich in component B and a third being rich in component C, by means of chromatography using a simulated moving bed, particularly one of the simplest design which includes four unit beds and which is adapted to permit unidirectional internal liquid flow.

Another object of the invention is to provide a method for lowering the content of component A or C in the fraction that is rich in component B, thereby increasing the purity of component B in that fraction.

The method of chromatographic separation according the invention comprises:

a feed-withdrawal stage in which, with liquid flow being permitted from the first to the third unit beds in the simulated moving bed, an eluant is fed into the first unit bed and the feed stock is fed into the third unit bed while, at the same time, part of the effluent from the first unit bed is withdrawn from the system as a fraction rich in component B and the effluent from the third unit bed is withdrawn from the system as a fraction rich in component C;

a circulation stage in which, with liquid circulation being permitted through the simulated moving bed, the liquid in the simulated moving bed is moved downstream without liquid feed to or withdrawal from the simulated moving bed; and a withdrawal stage in which, with liquid flow being permitted from the second to the first unit beds, the eluant is fed to the second unit bed and the effluent from the first unit bed is withdrawn from the system as a fraction rich in component A;

wherein, after the above three stages are performed, the above-described stages are repeated in the same order except that feed stock and eluant are fed to and effluents are withdrawn from the unit beds which exist immediately downstream of each corresponding unit bed, whereby the feed stock containing components A, B and C can be separated into fractions that are rich in the respective components.

BRIEF DESCRIPTION OF THE DRAWINGS

The above and other objects and features of the present invention will be more apparent from the following description taken in conjunction with the accompanying drawings.

FIGS. 1A to 1C show illustratively the concentration profiles of betaine, sucrose, as well as ash and other non-sugars that occur within a simulated moving bed when sugar beet molasses is separated into three fractions, rich in respective components according to the present invention, in which FIG. 1A shows the concentration profiles at the end of withdrawal stage where water was supplied to the second unit bed while betaine-rich fraction was withdrawn from the first unit bed, FIG. 1B shows the concentration profile at the end of feed-withdrawal stage, and FIG. 1C shows the concentration profile at the end of circulation stage.

DETAILED DESCRIPTION OF THE PREFERRED EMBODIMENTS

Figure 1A:
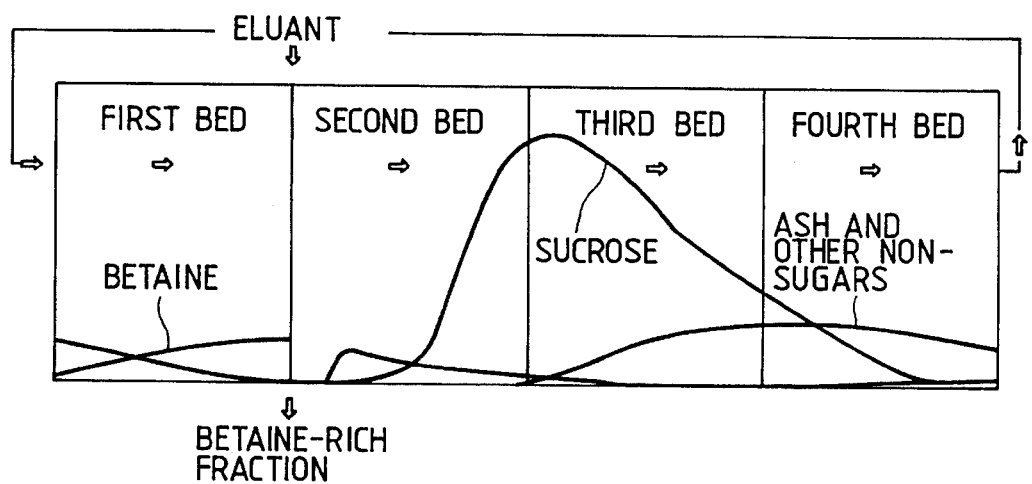

The present invention will now be described in detail.

The feed stock to be subjected to chromatography in accordance with the invention contains at least three components, a component A that interacts strongly with an adsorbent, a moderately interacting component B and a weakly interacting component C. Typically, component B which interacts moderately with the adsorbent is contained in the feed stock in an amount greater than each of components A and C. According to the invention, a fraction that contains this component B in high purity can be obtained from the feed stock.

Sugar beet molasses is a typical example of the feed stock that has the characteristics described above. Depending on the method of sugar production, sugar beet molasses usually contains, on the basis of dry substance, 45 to 75 wt % of sucrose (especially 50 to 70 wt %), 20 to 45 wt % of ash and other non-sugars (especially 20 to 30 wt %) and 5 to 10 wt % of betaine. It is strongly desired to recover sucrose in high purity from such sugar beet molasses. Since the intensity of interaction with strongly acidic cation-exchange resins of alkali metal salt forms which are customarily used in the recovery of sucrose from molasses decreases in the order of betaine, sucrose and ash and other non-sugars, the invention permits sucrose to be recovered in high purity from the beet molasses.

Other typical examples of the feed stock that may be subjected to the method of the invention are the molasses that is a by-product of the production of sucrose from sugar cane and the molasses that is a by-product of the production of refined sugar from raw cane sugar. These molasses contain sucrose as the main component and they also contain monosaccharides such as glucose as well as ash and other non-sugars. Since the intensity of interaction with strongly acidic cation-exchange resins of alkali metal salt forms decreases in the order of monosaccharides, sucrose and ash and other non-sugars, the invention permits sucrose to be recovered in high purity from the molasses of the various kinds mentioned above.

The starch hydrolysate which is obtained by hydrolyzing starch to produce maltose is another example of the feed stock that can advantageously be used in the method of the invention. In addition to the main component maltose, the hydrolysate also contains oligosaccharides larger than maltose, as well as glucose. Since the intensity of interaction with strongly acidic cation-exchange resins of alkali metal salt forms decreases in the order of glucose, maltose and oligosaccharides, the invention permits maltose to be recovered in high purity.

The simulated moving bed to be used in the present invention is composed of four unit beds of the same size that are interconnected to form a liquid circulation path, with one or more pumps for allowing unidirectional liquid movement being provided in the circulation path. Each unit bed is provided within the top portion thereof with a means for distributing the externally supplied feed stock and eluant as well as effluent fed from the unit bed immediately upstream of the unit bed in question and it is also provided within the bottom portion thereof with a means for collecting the effluent from the bed. Since the feed stock and eluant will not be supplied simultaneously to the same unit bed, a single liquid distributor may be shared by the feed stock and eluant. The method of the invention may be implemented using a simulated moving bed that includes more than four unit beds, say, eight or twelve unit beds but this is not preferred because of high equipment cost. As is well known, a minimum number of unit beds that compose the simulated moving bed is four and, theoretically speaking, better performance is assured by using more unit beds but, on the other hand, the equipment cost will increase. The present invention assures satisfactory performance using a simulated moving bed of the simplest design which includes four unit beds.

The adsorbent packed in the unit beds is selected in accordance with the components of the feed stock. If sucrose and betaine are to be recovered from sugar beet molasses, strongly acidic cation-exchange resins of alkali metal salt forms such as potassium or sodium salts are used as adsorbents. It should be noted here that since sugar beet molasses contains large amounts of potassium, a Na-form ion-exchange resin used as an adsorbent will undergo partial conversion to a K-form ion-exchange resin during chromatographic operation. However, this conversion has little effect on the separation performance of the simulated moving bed. Needless to say, sodium chloride or sodium sulfate solution may occasionally be passed through the bed so as to effect reconversion to the Na-form ion-exchange resin if this is desired by the operator of the system.

Unlike the usual operation of a simulated moving bed, the practice of the method of the invention adopts as one process step the combination of a feed-withdrawal stage and a withdrawal stage, in both of which solutions are supplied to the simulated moving bed while, at the same time, fractions rich in either components of the feed stock are withdrawn from the bed, and a circulation stage in which the liquid in the bed is moved downstream without liquid feed to or withdrawal from the bed. When one step of this process ends, the ports of liquid feed to the bed and the ports of liquid withdrawal from the bed are switched to the corresponding ports on the immediately downstream unit bed. Since the simulated moving bed employed in the invention is of the simplest design which includes four unit beds, four steps of the process described above will bring the simulated moving bed back to the initial state.

The respective stages of one process step play different roles. The role of the circulation stage is to separate the respective components of the feed stock so that desired concentration profiles for those components are formed within the simulated moving bed. Stated more specifically, the liquid in the bed is moved downstream without performing either liquid feed or withdrawal in the circulation stage, during which the respective components of the liquid that move at different rates depending on the relative intensities of interaction with the adsorbent will be separated progressively to form desired concentration profiles within the simulated moving bed.

As will be described later in this specification, the withdrawal stage performs the same function as the circulation stage with respect to the formation and movement of concentration profiles and, therefore, the liquid movement that is effected in the circulation and withdrawal stages within one process step in the present invention causes the concentration profiles to be regenerated as a result of the liquid movement downstream the bed by a distance corresponding to one unit bed.

In the practice of the invention, at least 50% of the time taken to perform one step of the process is typically assumed by the circulation and withdrawal stages, preferably by the circulation stage alone. In other words, the circulation stage is predominant over the feed-withdrawal and withdrawal stages in terms of the relative times taken by the respective stages of the one process step. This is due to the fact that liquid movement in the circulation stage is chiefly responsible for the formation of concentration profiles. At the end of the circulation stage, the respective components are typically distributed within the simulated moving bed in the following manner (assuming that the eluant is supplied to the first unit bed while the feed stock is supplied to the third unit bed in the feed-withdrawal stage immediately before the circulation stage): component A which interacts strongly with the adsorbent is present enriched in a zone spanning the first and second unit beds; moderately interacting component B is present enriched in a zone spanning the second and third unit beds; and weakly interacting component C is present enriched in a zone spanning the third and fourth unit beds.

Liquid movement in the circulation stage is effected by means of one or more circulation pumps provided between unit beds. The pumps may be provided between every adjacent unit beds or, alternatively, only one pump may be provided in the simulated moving bed, for example, between the fourth and first unit beds.

When the circulation stage ends, the withdrawal stage will then start. In the withdrawal stage, the eluant is supplied to the second unit bed and allowed to flow down through the simulated moving bed so that component A which is present enriched in the first unit bed is withdrawn from the system as a fraction that is rich in component A. Liquid movement through the simulated moving bed that occurs in this stage is realized by the pressure of the eluant being supplied but if this pressure is insufficient, the circulation pumps may be operated as a booster. Stated more specifically, the eluant which is supplied to the second unit bed will push the liquid downstream of the bed so that it will flow into the third unit bed. The liquid in the third unit bed is similarly pushed downstream of the bed to flow into the fourth unit bed. By the same mechanism, the liquid in the fourth unit bed will flow into the first unit bed. The total quantity of the effluent from the first unit bed is withdrawn from the system as a fraction that is rich in component A. Thus, there is no liquid flow from the first to the second unit beds at the withdrawal stage.

Needless to say, the liquid movement through the simulated moving bed at the withdrawal stage is accompanied by the separation of the respective components and their concentration profiles will move downstream the bed. In other words, the withdrawal stage fulfills two functions, i.e., the movement of concentration profiles over the entire part of the simulated moving bed, and the withdrawal of the fraction rich in component A. It should, however, be noted that liquid movement through the simulated moving bed is considerably smaller in the withdrawal stage than in the circulation stage and, hence, the movement of concentration profiles is correspondingly smaller in the withdrawal stage than in the circulation stage. It is preferred that the rate of liquid movement through the simulated moving bed in the withdrawal stage is substantially set to be equal to that in the circulation stage because the rate of liquid movement in the circulation stage is typically determined in such a way that it is the most favored by the formation of concentration profiles. When the withdrawal stage ends, the feed-withdrawal stage then starts. Liquid movement through the simulated moving bed that occurs in this stage is realized by the pressure of the eluant and feed stock being supplied but if their pressures are insufficient, the circulation pump may be operated as a booster. In this feed-withdrawal stage, the second unit bed is supplied with the eluant and the fourth unit bed with the feed stock (in the feed-withdrawal stage of the preceding step, the first unit bed was supplied with the eluant and the third unit bed with the feed stock; hence, the feed and withdrawal ports have been switched to the corresponding ports on the immediately downstream unit bed). Withdrawn from the system at this stage are the liquid in the second unit bed that has been enriched with component B and the liquid in the fourth unit bed that has been enriched with component C. Stated more specifically, the eluant being supplied into the second unit bed pushes the liquid in that bed to be moved downstream so that it flows out of the second unit bed. In the present invention, part of this effluent from the second unit bed is withdrawn from the system as a fraction that is rich in component B while the remainder is allowed to flow into the third unit bed. The liquid already existing in the third unit bed is pushed downstream by the incoming liquid from the second unit bed to flow into the fourth unit bed. Since the fourth unit bed is being supplied with the feed stock, the liquid in that bed is pushed downstream by both the incoming liquid from the third unit bed and the feed stock to flow out of the fourth unit bed. In the present invention, the total quantity of this effluent from the fourth unit bed is withdrawn from the system as a fraction that is rich in component C.

In the feed-withdrawal stage, too, liquid movement is accompanied by progressive separation of the respective components and their concentration profiles will move downstream the simulated moving bed. Therefore, the fastest rate of liquid movement in this stage (i.e., the rate in the second or fourth unit bed) is preferably set to be substantially equal to the rate of liquid movement in the preceding circulation stage. Needless to say, the sum of the eluant and feed stock that are supplied to the simulated moving bed in the feed-withdrawal stage is equal to the sum of the two fractions that are withdrawn in the same stage, one being rich in component B and withdrawn from the second unit bed and the other being rich in component C and withdrawn from the fourth unit bed. The proportion of the effluent from the second unit bed that should be withdrawn from the system as a fraction rich in component B may appropriately be determined in accordance with the desired proportion of component B to be recovered and its desired purity in the fraction that is rich in component B. If a high recovery of component B is required, one may withdraw an increased quantity of the fraction that is rich in component B. Conversely, if a high purity of component B is desired, one may withdraw a reduced quantity of the fraction that is rich in component B.

Figure 1B:
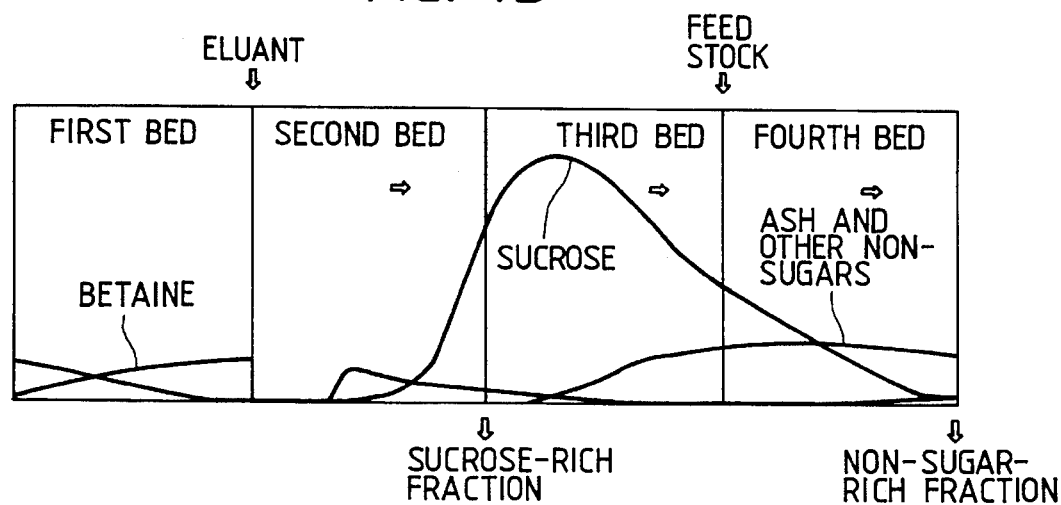
Figure 1C:
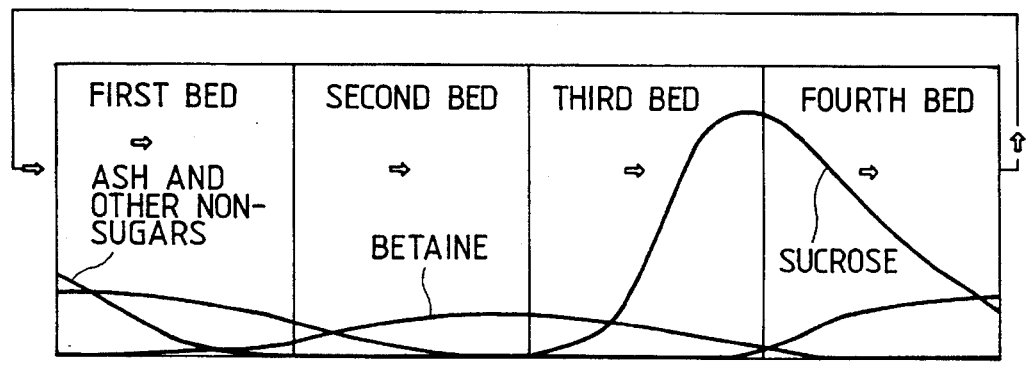

The respective stages of the operation of the simulated moving bed in implementing the method of the invention are described below more specifically with reference to the case of recovering sucrose and betaine from sugar beet molasses using a Na-form strongly acidic cation-exchange resin as an adsorbent, with water being used as an eluant. FIGS. 1A to 1C show illustratively the concentration profiles of betaine, sucrose, as well as ash and other non-sugars that occur within the simulated moving bed. FIG. 1A shows the concentration profiles at the end of the withdrawal stage where water was supplied to the second unit bed while a betaine-rich fraction was withdrawn from the first unit bed. When the simulated moving bed is in the state shown in FIG. 1A, feed-withdrawal stage starts and water is supplied to the second unit bed so that sucrose is eluted from said unit bed. Part of the effluent from the second unit bed is withdrawn from the system as a sucrose-rich fraction while the remainder is allowed to flow into the third unit bed. As a consequence, the liquid already existing in the third unit bed will move downstream so that the respective components are further separated while, at the same time, their concentration profiles will move downstream. The fourth unit bed is supplied with the sugar beet molasses as the feed stock. The total quantity of the effluent from the fourth unit bed is withdrawn from the system as a fraction that is rich in ash and other non-sugars that interact weakly with the adsorbent (which, hence, will move at the fastest rate). FIG. 1B shows the concentration profiles of the respective components in the simulated moving bed at the end of the above-described feed-withdrawal stage.

The feed-withdrawal stage is followed by the circulation stage, in which the liquid in the simulated moving bed is driven with the circulation pump to move downstream without liquid feed or withdrawal. As a consequence, the respective components are further separated and, at the same time, their concentration profiles are moved downstream the bed by a distance almost equal to one unit bed as compared to the profiles that occurred at the start of the process step.

FIG. 1C shows the concentration profiles of the respective components in the simulated moving bed at the end of the circulation stage. When the circulation stage ends, the water feed port is switched from the second to the third unit beds so as to effect the withdrawal stage, in which water is supplied to the third unit bed and the total quantity of the effluent from the second unit bed is withdrawn from the system as a betaine-rich fraction.

In terms of movement of the concentration profiles, this withdrawal stage is an extension of the circulation stage and corresponds to the case where externally supplied water is substituted for the circulation pumps as a means for causing liquid flow.

By performing the above-described three stages, the concentration profiles of the respective components in the simulated moving bed are moved downstream the bed by a distance equal to one unit bed.

The following examples are provided for the purpose of further illustrating the present invention but are in no way to be taken as limiting and various design modifications and alterations can be made without departing from the spirit and scope of the invention.

EXAMPLE 1

Figure 2:
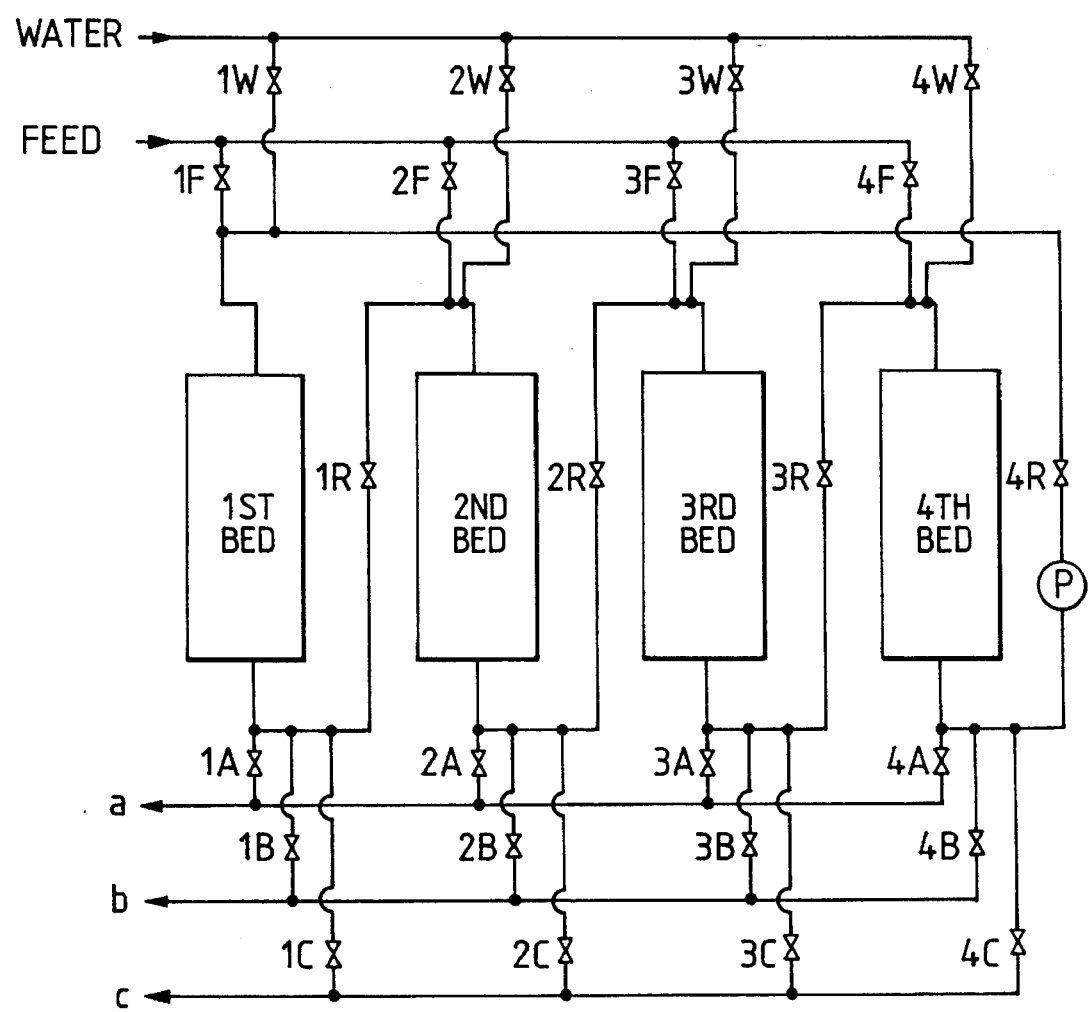
FIG. 2 is a schematic of a simulated moving bed wherein sugar beet molasses is separated in accordance with the method of the invention.

Using an apparatus of the type shown in FIG. 2, sugar beet molasses was separated into a sucrose-rich fraction, a betaine-rich fraction and a third fraction that was rich in ash and other non-sugars. The apparatus was a simulated moving bed including four unit beds each having an inside diameter of 2.73 cm and a height of 55 cm and being packed with 1288 ml of a Na-form strongly acidic cation-exchange resin. Each unit bed was kept heated at 75° C.

The apparatus was operated under the conditions shown in Table 1. The composition of the beet molasses as the feed stock, and the compositions of the respective fractions withdrawn during the steady-state operation are shown in Table 2. In a special case of the operation, the withdrawal stage was not performed but the circulation stage was extended by the time corresponding to the withdrawal stage and the compositions of the resulting two fractions, one being rich in sucrose and the other being rich in ash and other non-sugars, were as shown in Table 3 (in the absence of the withdrawal stage, there was no withdrawal of a betaine-rich fraction).

TABLE 1

| Process step | Stage | Feed fluid | Flow (ml) | Effluent | Flow (ml) | Open valves | Time (min) |
| --- | --- | --- | --- | --- | --- | --- | --- |
| 1 | Feed-withdrawal | feed stock | 12 | c | 54 | 3F, 3C, 1R, 2R | 4.56 |
|   |                 | water      | 57 | b | 15 | 1W, 1B | |
|   | Circulation     | —          | 95 | (circulated) |  | 1R, 2R, 3R, 4R | 7.60 |
|   | Withdrawal      | water      | 10 | a | 10 | 2W, 1A, 2R, 3R, 4R | 0.8 |
| 2 | Feed-withdrawal | feed stock | 12 | c | 54 | 4F, 4C, 2R, 3R | 4.56 |
|   |                 | water      | 57 | b | 15 | 2W, 2B | |
|   | Circulation     | —          | 95 | (circulated) |  | 1R, 2R, 3R, 4R | 7.60 |
|   | Withdrawal      | water      | 10 | a | 10 | 3W, 2A, 1R, 3R, 4R | 0.8 |
| 3 | Feed-withdrawal | feed stock | 12 | c | 54 | 1F, 1C, 3R, 4R | 4.56 |
|   |                 | water      | 57 | b | 15 | 3W, 3B | |
|   | Circulation     | —          | 95 | (circulated) |  | 1R, 2R, 3R, 4R | 7.60 |
|   | Withdrawal      | water      | 10 | a | 10 | 4W, 3A, 1R, 2R, 4R | 0.8 |
| 4 | Feed-withdrawal | feed stock | 12 | c | 54 | 2F, 2C, 1R, 4R | 4.56 |
|   |                 | water      | 57 | b | 15 | 4W, 4B | |
|   | Circulation     | —          | 95 | (circulated) |  | 1R, 2R, 3R, 4R | 7.60 |
|   | Withdrawal      | water      | 10 | a | 10 | 1W, 4A, 1R, 2R, 3R | 0.8 |

TABLE 2

| Description of component | Content in the feed stock (% on D.S) | Content in the fraction (% on D.S) | | |
| --- | --- | --- | --- | --- |
|  |  | a | b | c |
| Ash and other non-sugars | 27.0 | 12.2 | 2.7 | 74.0 |
| Raffinose | 1.4 | 0.0 | 0.4 | 3.5 |
| Sucrose | 64.5 | 12.0 | 93.7 | 17.5 |
| Betaine | 7.1 | 75.8 | 3.2 | 5.0 |
| Degree Brix | 61.0 | 4.2 | 34.3 | 5.8 | where betaine contains small amounts of reducing sugars, etc., and a refers to the betaine-rich fraction; b refers to the sucrose-rich fraction; and c refers to the fraction rich in ash and other non-sugars. The term "on D.S." means "on the basis of dry substance".

TABLE 3

| Description of component | Content in the feed stock (% On D.S.) | Content in the fraction (% On D.C) | |
|---|---|---|---|
| | | b | c |
| Ash and other non-sugars | 27.0 | 1.8 | 69.4 |
| Raffinose | 1.4 | 0.4 | 3.1 |
| Sucrose | 64.5 | 92.8 | 16.7 |
| Betaine | 7.1 | 5.0 | 10.8 |
| Degree Brix | 60.2 | 34.2 | 6.3 | where betaine contains small amounts of reducing sugars, etc., and b refers to the sucrose-rich fraction; and c refers to the fraction rich in ash and other non-sugars.

EXAMPLE 2

Using an apparatus of the same type as employed in Example 1 except that each unit bed was packed with 1240 ml of the cation-exchange rein, molasses that was a by-product of the production of refined sugar from raw cane sugar was separated into three fractions, one being rich in reducing sugars, etc., a sucrose-rich second fraction, and a third fraction rich in ash and other non-sugars. The order of intensity of interaction with the adsorbent was: reducing sugars>sucrose>ash and other non-sugars. Each unit bed was kept heated at 75° C.

The apparatus was operated under the conditions shown in Table 4. The composition of the molasses as the feed stock, and the compositions of the respective fractions withdrawn during the steady-state operation are shown in Table 5. For the sake of convenience in experiment, both the fraction rich in reducing sugars, etc. and the fraction rich in ash and non-sugars were admitted together into a single receptacle, so their compositions listed in Table 5 are estimated values as obtained by computer simulation. In a special case of the operation, the withdrawal stage was not performed but the circulation stage was extended by the time corresponding to the withdrawal stage and the compositions of the resulting two fractions, one being rich in sucrose and the other being rich in ash and other non-sugars, were as shown in Table 6.

EXAMPLE 3

The chromatographic separation process of starch hydrolysate into three fractions was followed by computer simulation on the assumption that an apparatus of the same type as employed in Example 1 was used, except that each unit bed was packed with 1240 ml of the cation exchange resin and kept heated at 65 ° C. The assumed operating conditions were shown in Table 7. The assumed composition of the feed stock and the estimated compositions of the respective fractions were shown in Table 8. The order of intensity of interaction with the adsorbent is: monosaccharides>disaccharides>trisaccharides and higher polysaccharides.

In a special case of the operation, computer simulation was carried out on an assumption that the withdrawal stage was not performed but the circulation stage was extended by the time corresponding to the withdrawal stage and the results are shown in Table 9.

TABLE 4

| Process step | Stage | Feed fluid | Flow (ml) | Effluent | Flow (ml) | Open valves | Time (min) |
|---|---|---|---|---|---|---|---|
| 1 | Feed-withdrawal | feed stock | 8 | c | 38 | 3F, 3C, 1R, 2R | 4.00 |
| | | water | 40 | b | 10 | 1W, 1B | |
| | Circulation | — | 92 | (circulated) | | 1R, 2R, 3R, 4R | 9.20 |
| | Withdrawal | water | 13 | a | 13 | 2W, 1A, 2R, 3R, 4R | 1.30 |
| 2 | Feed-withdrawal | feed stock | 8 | c | 38 | 4F, 4C, 2R, 3R | 4.00 |
| | | water | 40 | b | 10 | 2W, 2B | |
| | Circulation | — | 92 | (circulated) | | 1R, 2R, 3R, 4R | 9.20 |
| | Withdrawal | water | 13 | a | 13 | 3W, 2A, 1R, 3R, 4R | 1.30 |
| 3 | Feed-withdrawal | feed stock | 8 | c | 38 | 1F, 1C, 3R, 4R | 4.00 |
| | | water | 40 | b | 10 | 3W, 3B | |
| | Circulation | — | 92 | (circulated) | | 1R, 2R, 3R, 4R | 9.20 |
| | Withdrawal | water | 13 | a | 13 | 4W, 3A, 1R, 2R, 4R | 1.30 |
| 4 | Feed-withdrawal | feed stock | 8 | c | 38 | 2F, 2C, 1R, 4R | 4.00 |
| | | water | 40 | b | 10 | 4W, 4B | |
| | Circulation | — | 92 | (circulated) | | 1R, 2R, 3R, 4R | 9.20 |
| | Withdrawal | water | 13 | a | 13 | 1W, 4A, 1R, 2R, 3R | 1.30 |

TABLE 5

| Description of component | Content in the feed stock (% on D.S) | Content in the fraction (% on D.S) | | |
|---|---|---|---|---|
| | | a | b | c |
| Ash and other non-sugars | 35.0 | 21.1 | 0.7 | 77.2 |
| Sucrose | 50.0 | 3.1 | 90.0 | 7.4 |
| Reducing sugar | 15.0 | 75.8 | 9.3 | 15.4 |
| Degree Brix | 50.0 | 2.2 | 20.5 | 5.3 | where a refers to the reducing sugar-rich fraction; b refers to the sucrose-rich fraction; and c refers to the fraction rich in ash and other non-sugars.

TABLE 6

| Description of component | Content in the feed stock (% On D.S.) | Content in the fraction (% On D.C) b | c |
| --- | --- | --- | --- |
| Ash and other non-sugar | 35.0 | 2.9 | 71.9 |
| Sucrose | 50. | 85.7 | 4.7 |
| Reducing sugar | 15.0 | 11.4 | 23.4 |
| Degree Brix | 50.0 | 21.9 | 6.3 | where b refers to the sucrose-rich fraction; and c refers to the fraction rich in ash and other non-sugars.

TABLE 7

| Process step | Stage | Feed fluid | Flow (ml) | Effluent | Flow (ml) | Open valves | Time (min) |
| --- | --- | --- | --- | --- | --- | --- | --- |
| 1 | Feed-withdrawal | feed stock | 14 | c | 28 | 3F, 3C, 1R, 2R | 3.84 |
|   |                 | water      | 32 | b | 20 | 1W, 1B |   |
|   | Circulation | — | 116 | (circulated) |   | 1R, 2R, 3R, 4R | 13.9 |
|   | Withdrawal | water | 10 | a | 10 | 2w, 1A, 2R, 3R, 4R | 1.20 |
| 2 | Feed-withdrawal | feed stock | 14 | c | 28 | 4F, 4C, 2R, 3R | 3.84 |
|   |                 | water      | 32 | b | 20 | 2W, 2B |   |
|   | Circulation | — | 116 | (circulated) |   | 1R, 2R, 3R, 4R | 13.9 |
|   | Withdrawal | water | 10 | a | 10 | 3W, 2A, 1R, 3R, 4R | 1.20 |
| 3 | Feed-withdrawal | feed stock | 14 | c | 28 | 1F, 1C, 3R, 4R | 3.84 |
|   |                 | water      | 32 | b | 20 | 3w, 3B |   |
|   | Circulation | — | 116 | (circulated) |   | 1R, 2R, 3R, 4R | 13.9 |
|   | Withdrawal | water | 10 | a | 10 | 4W, 3A, 1R, 2R, 4R | 1.20 |
| 4 | Feed-withdrawal | feed stock | 14 | c | 28 | 2F, 2C, 1R, 4R | 3.84 |
|   |                 | water      | 32 | b | 20 | 4W, 4B |   |
|   | Circulation | — | 116 | (circulated) |   | 1R, 2R, 3R, 4R | 13.9 |
|   | Withdrawal | water | 10 | a | 10 | 1W, 4A, 1R, 2R, 3R | 1.20 |

TABLE 8

| Description of component | Content in the feed stock (% on D.S) | Content in the fraction (% on D.S) a | b | c |
| --- | --- | --- | --- | --- |
| Trisaccharides and higher polysaccharides | 40.0 | 4.0 | 1.6 | 90.2 |
| Disaccharides | 50.0 | 22.8 | 87.0 | 5.3 |
| Monosaccharides | 10.0 | 73.2 | 11.4 | 4.5 |
| Degree Brix | 50.0 | 2.5 | 26.0 | 17.0 | where trisaccharides and higher polysaccharides mainly comprise tri- and tetrasaccharides, with small amount of higher polysaccharides, and a refers to the monosaccharides-rich fraction; b refers to the disaccharides-rich fraction; and c refers to the fraction rich in trisaccharides and higher polysaccharides.

TABLE 9

| Description of component | Content in the feed stock (% On D.S.) | Content in the fraction (% On D.C) b | c |
| --- | --- | --- | --- |
| Trisaccharides and higher polysaccharides | 35.0 | 2.9 | 71.9 |
| Disaccharides | 50.0 | 85.7 | 4.7 |

TABLE 9-continued

| Description of component | Content in the feed stock (% On D.S.) | Content in the fraction (% On D.C) b | c |
| --- | --- | --- | --- |
| Monosaccharides | 15.0 | 11.4 | 23.4 |
| Degree Brix | 50.0 | 21.9 | 6.3 | where b refers to the disaccharides-rich fraction; and c refers to the fraction rich in trisaccharides and higher polysaccharides.

As was described above, according to the present invention, a simulated moving bed of the simplest design which includes four unit beds is used and yet a feed stock containing at least three components that interact with an adsorbent packed in the unit beds by different degrees of intensity can be separated into fractions that are rich in the respective components.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of separating a feed stock containing at least a component A that interacts strongly with an adsorbent, a moderately interacting components B and a weakly interacting component C into at least three fractions, one being rich in component A, a second being rich in component B and a third being rich in component C, by chromatography using a simulated moving bed that includes four unit beds and which is adapted to permit unidirectional internal liquid flow, said method comprising the stages of:

(a) with liquid flow being permitted from first to third unit beds, feeding an eluant into the first unit bed and the feed stock into the third unit bed, respectively, and simultaneously withdrawing part of the effluent from the first unit bed from the system as a fraction rich in component B and the effluent from the third unit bed from the system as a fraction rich in component C, respectively;

(b) with liquid circulation being permitted through the simulated moving bed, moving the liquid in the simulated moving bed downstream without liquid feed to or withdrawal from the simulated moving bed; and (c) with liquid flow being permitted from the second to first unit beds, feeding the eluant to the second unit bed and simultaneously withdrawing the effluent from the first unit bed from the system as a fraction rich in component A;

wherein, after the above stages (a) to (c) are performed as one step, the step is repeated except that feed stock and eluant are fed to and effluents are withdrawn from the unit beds which exist immediately downstream of the respective corresponding unit beds.

2. A method according to claim 1, wherein a time taken to perform the stages (b) and (c) is at least 50% of a time taken to perform one step of the process.

3. A method according to claim 1, wherein a time taken to perform the stage (b) is at least 50% of a time taken to perform one step of the process.

4. A method according to claim 1, wherein the amount of eluant fed in the stage (a) is larger than that in the stage (c).

5. A method according to claim 1, wherein the liquid flow rate in the stage (b) is equal to or greater than that in the stages (a) and (c).

6. A method according to claim 1, wherein the feed stock contains component B in a greater amount than each of components A and C.

7. A method according to claim 1, wherein the feed stock is molasses that is produced in the sucrose manufacture from sugar beets, molasses that is produced in cane sugar refining or a starch hydrolysate.

8. A method of separating sugar beet molasses that contains betaine, sucrose, as well as ash and other non-sugars into three fractions of a betaine-rich fraction, a sucrose-rich fraction and a fraction rich in ash and other non-sugars, using a simulated moving bed that is packed with a strongly acidic cation-exchange resin of an alkali metal salt form, that includes first to fourth unit beds and that is adapted to permit unidirectional internal liquid flow, said method comprising the stages of:

(a) feeding water to the first unit bed and sugar beet molasses to the third unit bed, respectively, and simultaneously withdrawing part of the effluent from the first unit bed from the simulated moving bed as a sucrose-rich fraction, allowing the remainder to flow into the second unit bed, allowing the total quantity of the effluent from the second unit bed to flow into the third unit bed, and withdrawing the total quantity of the effluent from the third unit bed from the simulated moving bed as a fraction rich in ash and other non-sugars;

(b) moving the liquid in the simulated moving bed circularly downstream without liquid feed to or withdrawal from the simulated moving bed; and (c) feeding water to the second unit bed, allowing the total quantity of the effluent from the second unit bed to flow into the third unit bed while, allowing the total quantity of the effluent from the third unit bed to flow into the fourth unit bed, allowing the total quantity of the effluent from the fourth unit bed to flow into the first unit bed, and withdrawing the total quantity of the effluent from the first unit bed from the simulated moving bed as a betaine-rich fraction;

wherein, after the above stages (a) to (c) are performed as one step, the above step is repeated except that molasses and water are fed to, and effluents are withdrawn from unit beds which exist immediately downstream of the respective corresponding unit beds.

9. A method according to claim 8, wherein the sugar beet molasses contains 45 to 75 wt % of sucrose on D.S, at least 50% of the time taken to perform one step of the process is assumed by stage (b), and the ratio of volume of water to sugar beet molasses both fed in one step of operation is 4 to 8.

* * * * *